(12) United States Patent
Braly (10) Patent No.: US 7,658,348 B1
(45) Date of Patent: Feb. 9, 2010

(54) ENHANCEMENT AND EXTENSION OF STRUCTURAL INTEGRITY OF AIRCRAFT STRUCTURE

(76) Inventor: George W. Braly, 331 W. Kings Rd., Ada, OK (US) 74820

( * ) Notice: Subject to any disclaimer, the term of this patent is extended or adjusted under 35 U.S.C. 154(b) by 421 days.

(21) Appl. No.: 11/438,731

(22) Filed: May 22, 2006

Related U.S. Application Data (60) Provisional application No. 60/683,759, filed on May 23, 2005.

(51) Int. Cl.
*B64C 1/26* (2006.01)
(52) U.S. Cl. ..................... 244/119; 244/131
(58) Field of Classification Search .............. 244/119, 244/123.1, 123.8, 131
See application file for complete search history.

(56) References Cited

U.S. PATENT DOCUMENTS

| | | | | |
|---|---|---|---|---|
| 1,749,951 | A * | 3/1930 | Lake | 244/119 |
| 3,018,985 | A * | 1/1962 | Voigt | 244/46 |
| 4,535,958 | A * | 8/1985 | Hutchison | 244/123.8 |
| 6,843,450 | B2 * | 1/2005 | Bath et al. | 244/131 |

\* cited by examiner

*Primary Examiner*—Rob Swiatek
(74) *Attorney, Agent, or Firm*—Bill D. McCarthy; Fellers, Snider, et al.

(57) ABSTRACT

A method and apparatus for modifying aircraft having a fuselage and center fuselage carry through structure that support wing structures, comprising placing a load transferring member to extend through the center fuselage carry through structure, and transferring the tension loads from the wing structures to the center fuselage carry through structure so as to provide a redundant load path that is resistant to the hazards of single point failures modes.

23 Claims, 7 Drawing Sheets

PRIOR ART

ENHANCEMENT AND EXTENSION OF STRUCTURAL INTEGRITY OF AIRCRAFT STRUCTURE

RELATED APPLICATION

The present application claims priority to U.S. Provisional Application No. 60/683,759 filed May 23, 2005, entitled Enhancement and Extension of Structural Integrity of Aircraft Structure.

BACKGROUND OF THE INVENTION

1. Field of the Invention

The present invention relates generally to improving the metallurgical fatigue life of certain general aviation aircraft airframe structures, and more particularly, but not by way of limitation, to enhancement and extension of the structural integrity thereof.

2. Discussion

It is known that aluminum aircraft structures accumulate metal fatigue with repetitive cyclic loading imposed on the structures as a result of flight loads and loading imposed from takeoffs and landings.

For various historic, economic and market reasons, the average age in flight hours of the general aviation fleet is increasing each year. Because the accumulation of fatigue in the aircraft metal structure tends to follow the flight hours, there is an ever increasing risk of fatigue accumulating to the point that many general aviation aircraft will have to be grounded because of unacceptable risks of fatigue cracks in primary airframe structures.

When sufficient fatigue damage has accumulated in the airframe, the accumulated fatigue will cause small cracks to initiate in localized portions of the airframe structure. As fatigue continues to accumulate, the cracks will inevitably grow, and if undetected and not repaired, there will eventually be failure of the airframe and probable loss of life if in flight.

It is known that fatigue damage is dramatically accelerated with increasing-load levels during repetitive cyclic loading of the airframes. This cumulative damage is highly nonlinear. Even small increases in loading levels result in disproportionately shortened fatigue life for airframe structures. Conversely, if critical portions of the structure can be identified and the loading on the critical structures reduced even by modest proportions, the useful fatigue life of the airframe can be greatly increased.

The fleet of Beechcraft Bonanza, Baron and T-34 airplanes manufactured by Beech Aircraft Corporation, now Raytheon Aircraft Corporation, all share a common design arrangement in the main wing structure. This common design arrangement consists of, among many other features, wing members that can be independently removed from the fuselage. The wings are attached to the fuselage structure with four bolts on each side, of which two are part of the front spar and two are part of the rear wing spar attachment structure on each side of the fuselage structure.

Within the fuselage is located a crucial portion of the total main wing spar structure, which is commonly referred to as the center spar carry through structure, or simply, for the purpose of this disclosure, the center spar. This structure is designed to tie the two wing spars together as an integral unit and to transfer the load from the two wings through the fuselage.

The center spar assembly consists of upper and lower principal structure elements. The upper portion of the center spar structure is normally in compressive loading, while the lower portion of the center spar structure is normally in tensile loading, both of which will vary with the flight and landing-loading.

Among features that commonly appear in these types of structures are the presences of highly loaded tension bolts that present potential failure points in the most critical portions of the structure. These failure modes result because there is no redundant load path to carry loads in the event one of the highly loaded tension bolts fails. Those skilled in the art recognize that avoiding critical structural features characterized by single point failure modes is desirable in the design of structures upon which human safety depends.

The normal loading for the aircraft operating in smooth air imposes tensile loading on the lower spar section proportional to the acceleration that the aircraft is experiencing with respect to the vertical axis through the aircraft structure. This acceleration is commonly referred to as the maneuver loading or 'g-load' for the aircraft. During turbulence, and during accidental or deliberate maneuvers, the g-load increases substantially, and depending on the particular type of aircraft, it can reach six times its normal loading for aerobatic maneuvers, and more during unintentional overload events.

In recent years, observations and investigations of accidents and incidents that involved similar aircraft and structures that had experienced long term repetitive high loading conditions revealed the presence of fatigue cracks that resulted in actual or pending structural failure. Other investigations revealed that the original detail design of the center carry through structure resulted in the creation of critical structural stress risers at specific locations that, if not mitigated, result in premature or early retirement of the airframe due to fatigue accumulation. The fatigue damage observed is almost entirely the result of tensile loading in such areas, as opposed to compressive loading.

Mitigation of the stress concentration features in the critical center fuselage structure is exceptionally difficult because access to the structure is restricted by its inherent original design, and disassembly is labor intensive and essentially cost prohibitive.

There have been attempts to mitigate fatigue accumulation of these types of structures by various means, including the installation of a 'spar strap.' This is a device in which a steel strap is arranged across the exterior of the belly of the fuselage of the aircraft and attached to the outboard area of each wing. This attempt at mitigation has several undesirable effects. Among these is that the steel and aluminum over large unprotected areas can cause dissimilar metal corrosion. Another is that the modification is labor intensive and expensive to install, and the installation restricts access to the areas of the wings that normally require repetitive maintenance inspections. Yet another large disadvantage of external spar strap arrangements is the additional resultant airframe drag, and the consequent reduction in speed, range and utility of the aircraft.

The present invention provides an effective and cost efficient solution to the problem discussed above while avoiding the disadvantages of the prior art.

SUMMARY OF INVENTION

The present invention provides a method and apparatus for modifying aircraft having a fuselage and center fuselage carry through structures that support wing structures. A load transferring member is extended to pass through the center fuselage carry through structure, serving to transfer tension loading incurred by the wing structures to the center fuselage carry through structure, thereby providing a redundant load path resistant to single point failures modes.

In a preferred embodiment the pre-existing tension bolts that connect the wings to the center fuselage carry through structure are replaced by tension bolts that have central bores there through. On opposing sides of the aircraft, fixtures attach to the replacement tension bolts and to a tension cable that extends through the center fuselage carry through structure, whereby moment from the wing structures are transferred to the center fuselage carry through structure, thereby serving as a redundant load path that increases the fatigue life of the airframe.

The objects, features and advantages of the present invention will be apparent from the following detailed description when read conjunction with the drawings and appended claims.

BRIEF DESCRIPTION OF THE DRAWINGS

FIG. 6 is an elevational view in partial cutaway of the structure of FIG. 4 showing an alternative embodiment to that of FIG. 5.

DESCRIPTION

Figure 1:
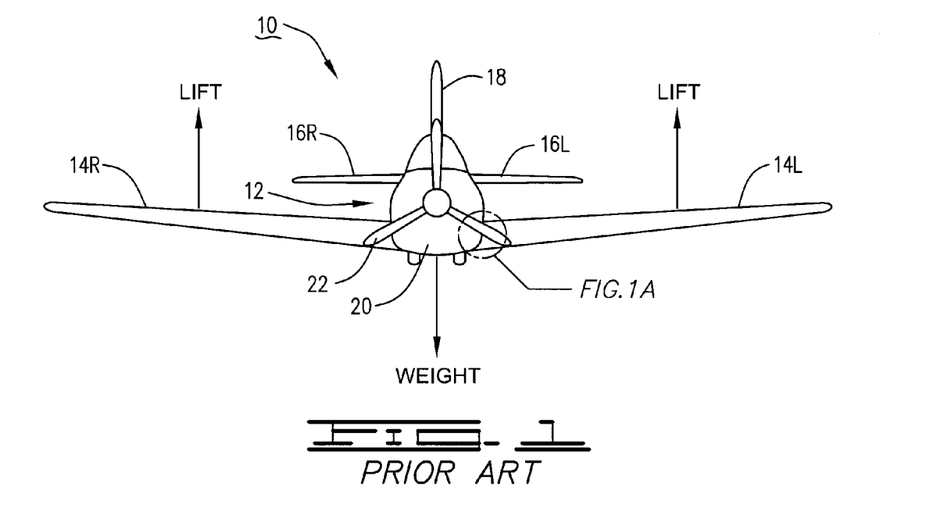
FIG. 1 is a diagrammatical representation of the arrangement of the fuselage and wings of a typical aircraft structure for which the present invention is applicable.

The present invention presents a method and apparatus for solving the fatigue accumulation problem associated with the loading of the fuselage carry through structure of aircraft such as that of a typical aircraft 10 shown in FIG. 1 and which experience moment transfer from the wings and other members thereof. While preferred embodiments of the present invention will be described as illustrative applications thereof, it will be understood that the present invention encompasses other means than that described, and that the invention is applicable to vehicles other than aircraft. As used herein, the words right and left are referenced to the pilot's or operator's right and left.

Figure 1A:
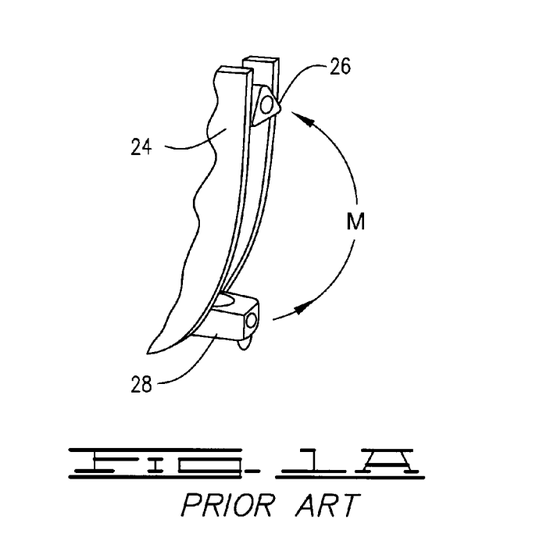
FIG. 1A is a partial perspective view of the center fuselage section of the aircraft of FIG. 1.

A conventional aircraft consists of a fuselage 12; wing assembly 14R, 14L to provide the majority of lift; a horizontal stabilizer 16R, 16L for stability; a vertical stabilizer 18 at the tail for stability; and a power plant, or engine 20, with a multi-propeller 22. The wings 14R, 14L are detachable from the fuselage 12 in which is contained a center fuselage carry through structure 24, portions of which are depicted in FIG. 1A and which need not be described in greater detail than that which appears herein. The left wing and fuselage junction area is depicted in FIG. 1A, which shows that the fuselage carry through structure 24 comprises a pair of upper and lower spar members 26, 28. The main wing spars of the wings 14R, 14L are attached to the lower spar member 28 in the illustrative aircraft 10 as described for the purpose of the present disclosure.

Figure 2:
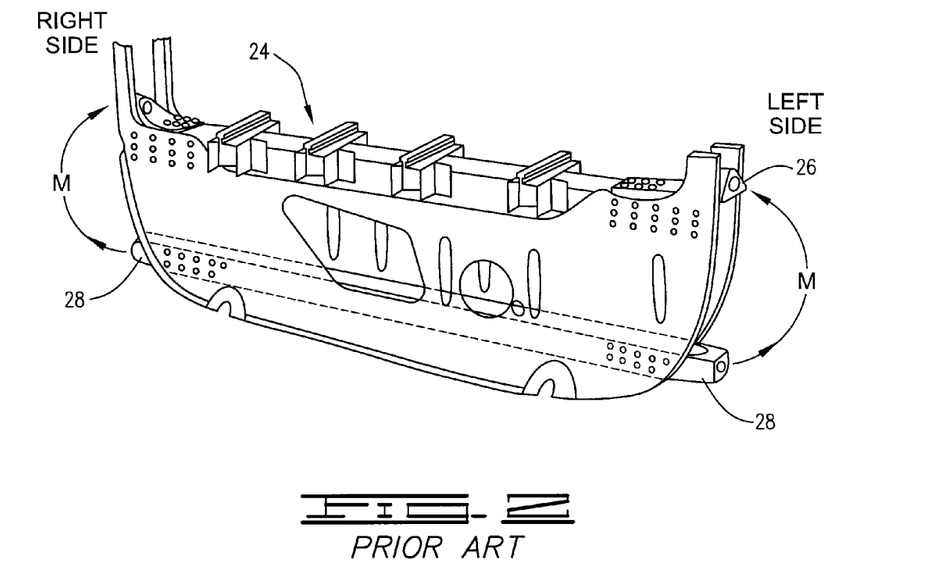
FIG. 2 is a semi-detailed, perspective view of the center fuselage section of FIG. 1.

FIG. 2 shows further details of the center fuselage carry through structure 24 of the illustrative aircraft 10, and more specifically, this figure shows the extensions of the upper and lower spar members 26, 28. Included is an indication reflecting how the bending moments M are transferred from the wings 14R, 14L to the center fuselage carry through structure 24.

Figure 3:
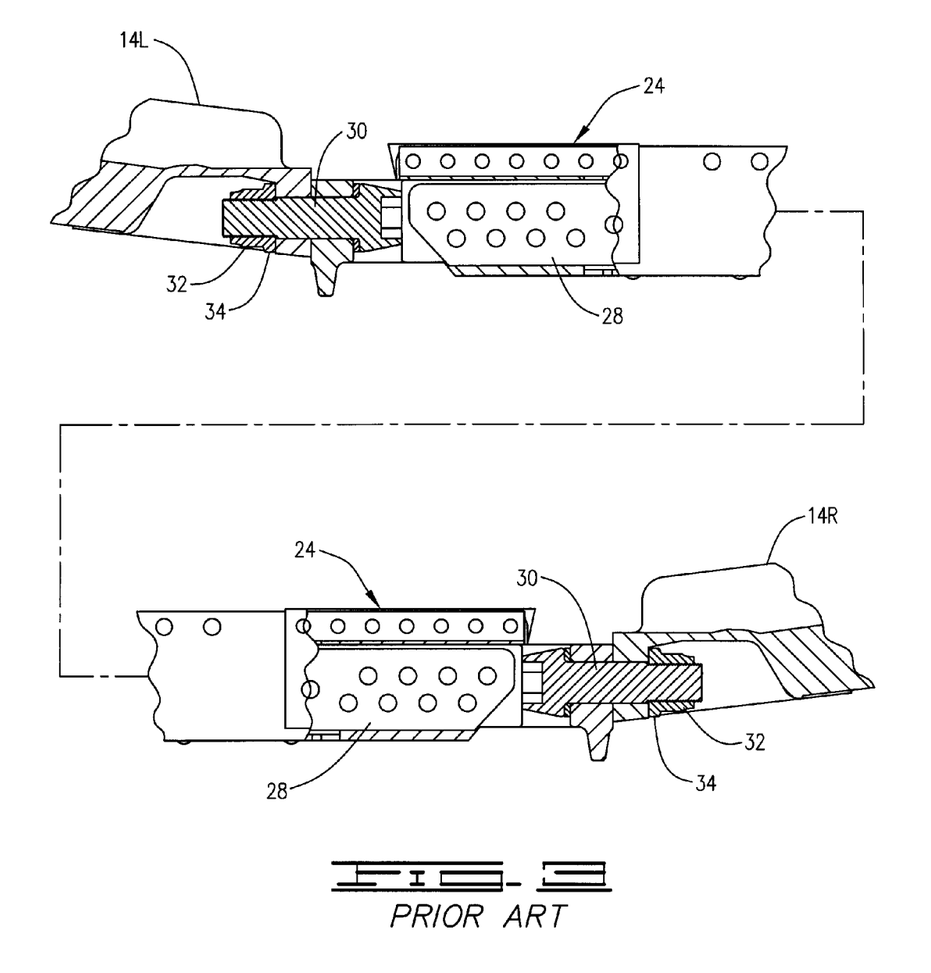
FIG. 3 is a partial view of the center fuselage section of FIG. 1 showing the wing attachments.

Referring to FIG. 3, the wings 14R and 14L attach to the lower spar member 28 of the center fuselage carry through structure 24 by means of several tension bolts 30, two of which are shown. Each of the tension bolts 30 has a nut 32 and washer 34 that transfer tension load to the lower spar member 28. The fatigue problems discussed above involves this wing attaching means. In the description of the present invention that follows, the tension bolts and the replacements therefor will be discussed in pairs, and it will be understood that the modification taught herein can be applied to one or multiple pairs of tension bolts.

Figure 4:
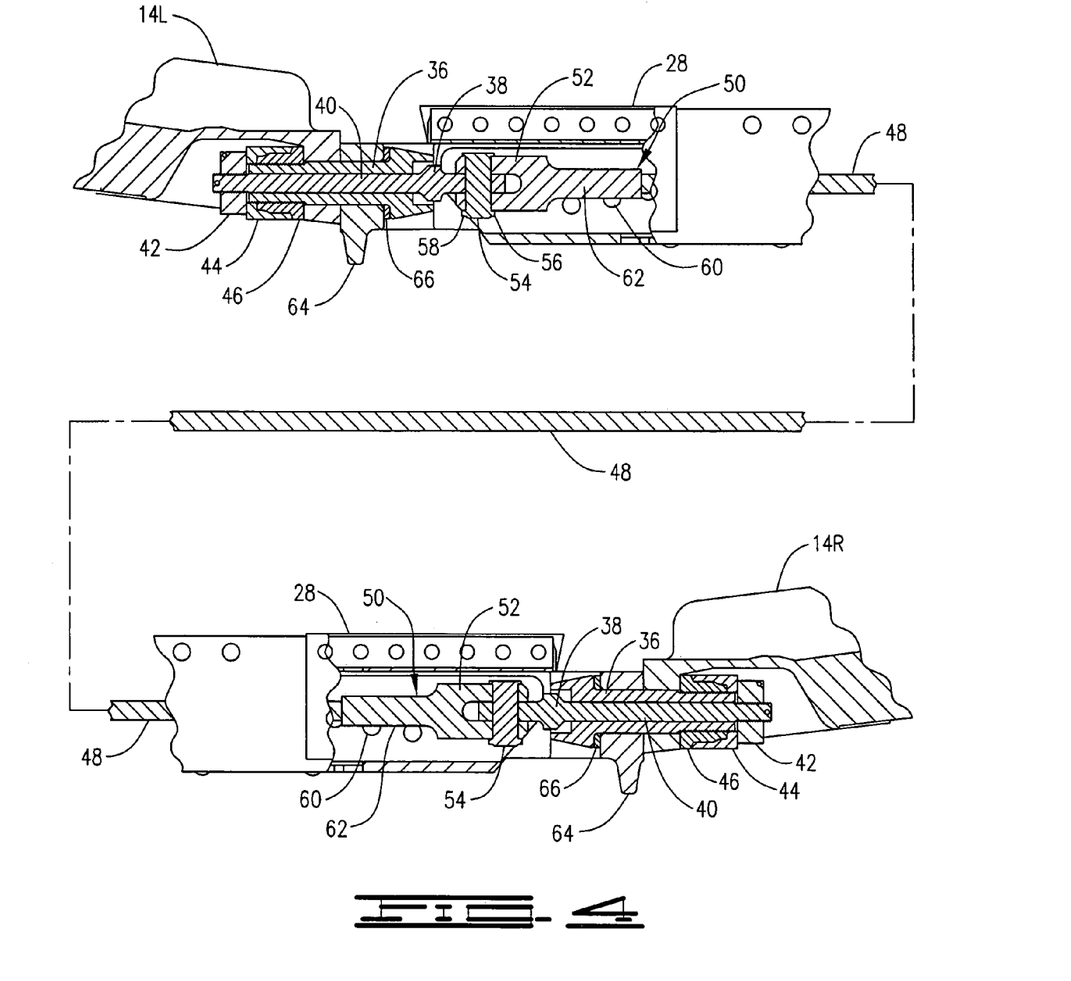
FIG. 4 is an elevational view in cutaway of a portion of the wing attachment means of the airplane of FIG. 1 as modified by the present invention.

Moving now to FIG. 4, this is view similar to that of FIG. 3 but showing the installation of the present invention to solve the fatigue accumulation problem associated with the wing attaching means. FIG. 4 shows the replacement of the tension bolts 30 with tension bolts 36; each tension bolt 36 has a longitudinally extending central bore that accommodates a fitting 38 that has a rod portion 40 passing through the central bore of the bolt. The rod portion 40 extends outboard from the bolt 36 where the fitting 38 is secured by a nut 42 that bears on a shim 44 that transfers tension load to the inboard base of a pre-existing primary structural nut 46 that threadingly engages the tension bolt 36 and is retained by the lower spar member 28. As conventional, all such bolts and thread engagements are secured by appropriately disposed pinning (not shown).

The fittings 38 can be connected by various means or devices to a tension cable 48 that will extend between pairs of the tension bolts 36. One preferred means consist of a connector fitting 50 that has an integral fork or clevis 52 that is mated with a shear pin 54 secured in the fork with a snap ring 56 mounted over a washer 58. The shear pin 54 passes through a bore in the inboard end of the fitting 38 disposed within the tines of the clevis 52, and cable pins 60 may be used to further secure the inboard swage end 62 of the clevis 52 to the tension cable 48. Other features of the structure of FIG. 4 are the jack point 64 and washer 66.

Figure 5:
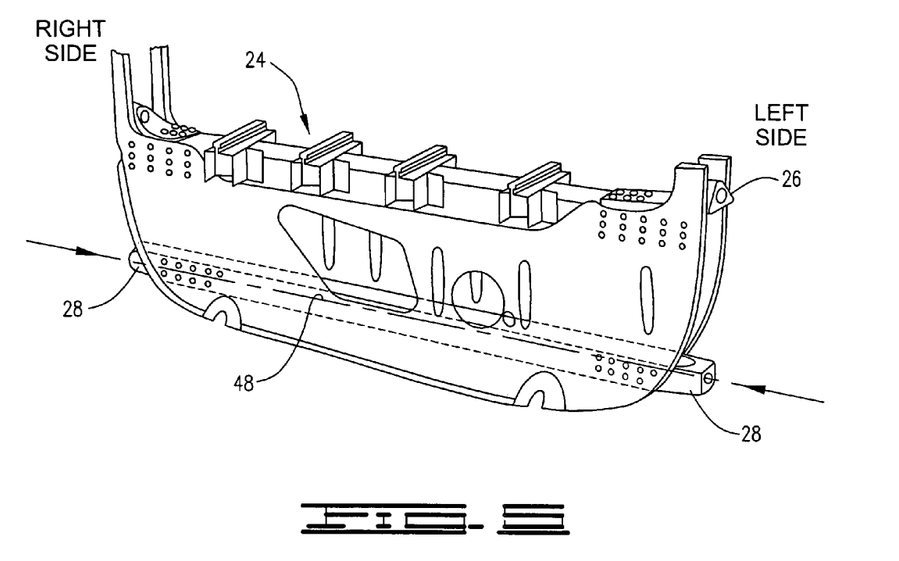
FIG. 5 is an elevational view in partial cutaway showing the structure of FIG. 4 as modified by the present invention.

FIG. 5, a view that is similar to FIG. 2, shows the routing of the tension cable 48 of the present invention. This figure shows the center fuselage carry through structure 24 of the illustrative aircraft 10, and more specifically, it shows the extensions of the upper and lower spar members 26, 28. Included is an indication reflecting how the bending moments M are transferred from the wings 14R, 14L to the center fuselage carry through structure 24. The cable 48 extends through the hollow core of the lower spar member 28, the ends of which secure to the wings 14R and 14L by the means described above.

Shown in FIG. 6 is another wing attaching means in which each tension bolt 36 has a longitudinally extending central bore that accommodates a fitting 38A that has a rod portion 40A passing through the central bore of the bolt 36. The rod portion 40A extends outboard from the bolt 36 where the fitting 38A is secured by the nut 42 that bears on the shim 44 to transfer tension load to the inboard base of the primary structural nut 46 that threadingly engages the bolt 36 and is retained by the lower spar member 28. As conventional, all such bolts and thread engagements are secured by appropriately disposed pinning (not shown).

The fitting 38A has an enlarged inboard end 68 that has a threaded bore. The fitting 38A is joined to a connector fitting 50A that has a threaded outboard end 70A that is threadingly engaged with the threaded bore in the inboard end 68 and is appropriately pinned for retention therein. The connector fitting 50A has an inboard end 72 that is swaged onto one end of the tension cable 48 and appropriately secured thereto.

Figure 7:
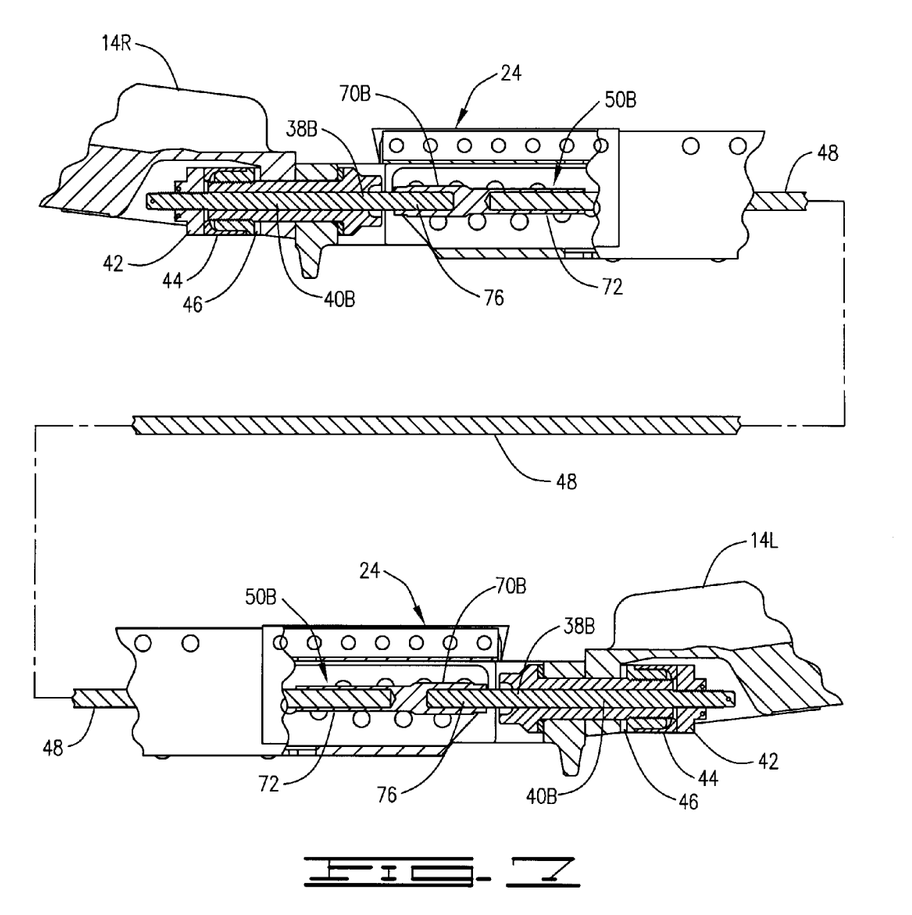
FIG. 7 is an elevational view in partial cutaway showing the structure of FIG. 4 as modified by another embodiment of the present invention.

Shown in FIG. 7 is another wing attaching means in which each tension bolt 36 has a longitudinally extending central bore that accommodates a fitting 38B with an end threaded, outboard rod portion 40B that passes through the central bore of the bolt 36. The threaded end of the rod portion 40B extends from the bolt 36 where it is secured by the nut 42 that bears on the shim 44 to transfer tension load to the inboard base of the primary structural nut 46 that threadingly engages the bolt 36 and is retained by the lower spar member 28.

The inboard end 76 of the fitting 38B is also threaded and is joined to a connector fitting 50B that has an outboard end 70B that has a threaded bore in which the threaded end 76 is threadingly engaged. The connector fitting 50B has an inboard end 72 that is swaged onto one end of the tension cable 48. As conventional, all bolts and thread engagements are secured by appropriately disposed pinning (not separately numbered).

The arrangement of FIG. 4 (and as well, those of FIGS. 6-7) provides a solution to the fatigue life problem historically experienced by the type of aircraft structure depicted. The replacement tension bolts attached to the tension cable that extends through the center fuselage carry through structure results in the transfer of stresses from the wing structures to the center fuselage carry through structure, thereby serving as a redundant load path that increases the fatigue life of the airframe.

It will be appreciated that the present invention is not limited to these structural arrangements, as other methods of attaching the steel tension cable 48 to the wing attaching bolts will be readily apparent to one skilled in the art and which could also be used with significant improvement and resulting in improved fatigue life of the airframe.

While the tension cable 48 will preferably be a steel cable having sufficient strength for the application described herein, it will be understood that such is only one of several possible means that will provide the necessary alternative load path of the present invention. In addition to a steel cable, it is also possible to use a series of flexible strips of a suitable, high strength material, threading such strips into and across the interior of the central carry through aircraft structure to create an arrangement to secure and attach the ends of those assemblies to the tension bolts or the fittings described above.

Installation of the structural modification of the present invention is made possible in the restricted access of the existing aircraft structure by use of high strength, flexible material that can be threaded into the lower center fuselage carry through structure 24 through existing access holes which normally provide access for the installation or removal of the existing tension bolts 30. Once inserted, the flexible material (the cable 48, whatever its makeup) can be manipulated through the interior of the lower spar member 28 and across to the opposite side thereof, as shown in the above described drawings.

Once initially installed, the tension cable 48 (or other structure used instead of a cable) should normally be pre-loaded. By calculation, test or both, one skilled in the art can determine appropriate levels of torque to apply to the nuts 42 to achieve the desired pre-tension loading. The use of appropriate levels of pre-tension can greatly enhance the ability of the invention to relieve stress on the existing historical structure and thereby greatly extend the structure's useful future fatigue life.

As mentioned previously, materials other than high strength steel cable can be used, and these can include high strength manufactured fibers such as carbon fiber structures, Kevlar® structures, or even steel, titanium and other suitable metallic or composite rod or rods. In using a solid rod type structure in lieu of the cable 48, the diameter or cross sectional dimensions of the rods should be sufficiently small to afford the necessary flexibility to the rods for insertion thereof into the aircraft structure and passage internally as threaded from one side to the other. This can be accomplished by using one or more rods that can be connected or attached at each end after insertion in the existing structure to form an integral structure. In any event, when such steel or other materials are fashioned into a workable arrangement, it is required that the arrangement exhibit both sufficient strength and flexibility to be readily inserted and threaded through the small passages internal to the existing structure, while also achieving the enhancement and extension of the structural integrity of the aircraft.

In the most desirable implementation of the present invention, it is preferred to use a high strength material that is somewhat stiffer (has a modestly higher Young's modulus of elasticity) than the existing primary aircraft aluminum structure and that has a higher limit and ultimate tensile strength (to yield) as compared to the existing aircraft aluminum structure. High strength steel cable is one such suitable material. Attention should be given to differences in the thermal coefficient of expansion for the materials used for the tension cable (or other tension structure used instead of a cable) as compared to the thermal coefficient of expansion for the pre-existing aluminum structure. If that differential is large, it is desirable that due consideration be given to the amount of pre-loading employed in the installation of the central tension cable so as to maintain appropriate pre-loading of the tension cable under all probable variations in the environmental temperature to be encountered during flight.

It will be recognized that disposing a bore through a critical structural fastener, such as the replacement tension bolts 30, will normally reduce its tensile strength and ability to carry loads. However, in the practice of the present invention, the tension cable and the associated attachment fittings not only replace the strength loss of the tension bolt occasioned by the bore there through, but once the modified tension bolt is installed using current state of the art high-strength materials and having been properly pre-tensioned, the method and apparatus of the present invention provide a structure that is as strong or stronger than the original tension bolt structure, and as well, affords redundant load paths for enhanced structural integrity. Thus, the practice of the present invention will maintain and enhance the structural integrity of the existing tension bolt arrangement while greatly extending the fatigue life of the aluminum components of the structure.

It is clear that the present invention is well adapted to carry out the objects and to attain the ends and advantages mentioned as well as those inherent therein. While presently preferred embodiments of the invention have been described in varying detail for purposes of the disclosure, it will be understood that numerous changes can be made which will readily suggest themselves to those skilled in the art and which are encompassed within the spirit of the invention disclosed and as defined in the above text and in the accompanying drawings.

What is claimed is:

1. An apparatus for enhancing the structural integrity of aircraft wing structures supported by a fuselage carry through structure of an airframe, comprising:
   a tension transfer device extending through said fuselage carry through structure; and
   means for connecting the tension transfer device to the wing structures and the fuselage carry through structure to distribute the stress on the fuselage carry through structure to extend the useful fatigue life of the airframe.

2. The apparatus of claim 1 in which the tension device is preloaded.

3. The apparatus of claim 2 wherein the tension device is preloaded by an amount determined by load requirements of the aircraft.

4. The apparatus of claim 1 wherein the tension transfer device is a cable.

5. The apparatus of claim 4 wherein the cable is made of high strength steel.

6. The apparatus of claim 1 wherein the connecting means comprises:
   a pair of tension bolts supported by the fuselage carry through structure, the tension transfer device connected to extend between the tension bolts.

7. An apparatus for enhancing the structural integrity of aircraft wing structures supported by a fuselage carry through structure, comprising:
   a tension transfer cable extending through said fuselage carry through structure; and
   means for connecting the tension transfer cable to the wing structures and the fuselage carry through structure to distribute the stress from the wings to the fuselage carry through structure to extend the useful fatigue life of the wing structures.

8. The apparatus of claim 7 wherein the connecting means further comprises:
   tensioning means for pre-tensioning the tension transfer cable.

9. The apparatus of claim 8 wherein the cable is made of high strength steel.

10. The apparatus of claim 9 wherein the tension device is preloaded by an amount determined by load requirements of the aircraft.

11. The apparatus of claim 8 wherein the cable is made of non-metal.

12. The apparatus of claim 11 wherein the tension device is preloaded by an amount determined by load requirements of the aircraft.

13. A method of enhancing the structural integrity of aircraft wing structures supported by a fuselage carry through structure, comprising the steps of:
   connecting a tensioning device to a first wing structure on one side of the fuselage carry through structure;
   extending the tensioning device to the other side of the fuselage carry through structure so as to pass therethrough; and
   connecting the tensioning device to a second wing structure on said other side of the fuselage carry through structure.

14. The method of claim 13 further comprising the step of:
   pre-loading the tensioning device.

15. For an aircraft having a fuselage carry through structure that supports wing structures by tension bolts supported by the fuselage carry through structure, a method comprising the steps of:
   placing a load transferring member to extend through the fuselage carry through structure; and
   transferring the tension loads normally carried by the tension bolts from the wing structures to the fuselage carry through structure so as to provide a redundant load path that is resistant to fatigue accumulation at single point failure modes.

16. For an aircraft having a fuselage carry through structure configured to support wing structures by pre-existing tension bolts supported by the fuselage carry through structure, a method comprising the steps of:
   replacing the pre-existing tension bolts with replacement tension bolts having central bores extending therethrough;
   placing a load transferring cable through the fuselage carry through structure; and
   connecting the ends of the cable to the replacement tension bolts so as to transfer tension loads normally carried by the pre-existing tension bolts from the wing structures to the fuselage carry through structure so as to provide a redundant load path that is resistant to fatigue accumulation at single point failure modes.

17. The method of claim 16 wherein the connecting step comprises:
   connecting the replacement tension bolts to the wing structures by a fixture having a threaded nut that pre-loads the cable upon turning thereof.

18. An apparatus for enhancing the structural integrity of aircraft wing structures supported by a fuselage carry through structure, comprising:
   a tension transfer device extending through the fuselage carry through structure; and
   means for connecting the tension transfer device to the wing structures and the fuselage carry through structure to distribute the stress on the fuselage carry through structure to extend the useful fatigue life of the wing structures, said means comprising tensioning means for pre-tensioning the tension transfer device.

19. The apparatus of claim 18 wherein the tension transfer device is a cable.

20. The apparatus of claim 19 wherein the tension device is preloaded by an amount determined by load requirements of the aircraft.

21. The apparatus of claim 20 wherein the cable is made of high strength steel.

22. The apparatus of claim 20 wherein the cable is made of non-metal.

23. An apparatus for enhancing the structural integrity of aircraft wing structures supported by a fuselage carry through structure, comprising:
   a tension transfer cable; and
   means for connecting the tension transfer cable to the wing structures and the fuselage carry through structure to distribute the stress on the fuselage carry through structure to extend the useful fatigue life of the wing structures, said means comprising a pair of tension bolts supported by the fuselage carry through structure, the tension transfer cable connected to extend between the tension bolts.

* * * * *